US009170793B2

(12) United States Patent
Chang et al.

(10) Patent No.: US 9,170,793 B2
(45) Date of Patent: Oct. 27, 2015

(54) SYSTEM AND METHOD FOR DISPLAYING MEASUREMENT PROGRAMS

(71) Applicants: Chih-Kuang Chang, New Taipei (TW); Xin-Yuan Wu, Shenzhen (CN); Gen Yang, Shenzhen (CN)

(72) Inventors: Chih-Kuang Chang, New Taipei (TW); Xin-Yuan Wu, Shenzhen (CN); Gen Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 275 days.

(21) Appl. No.: 13/649,147

(22) Filed: Oct. 11, 2012

(65) Prior Publication Data

US 2013/0111437 A1 May 2, 2013

(30) Foreign Application Priority Data

Oct. 31, 2011 (CN) .......................... 2011 1 0338034

(51) Int. Cl.
*G06F 9/45* (2006.01)
*G06F 9/44* (2006.01)
*G06F 3/0481* (2013.01)

(52) U.S. Cl.
CPC .............. *G06F 8/45* (2013.01); *G06F 3/04817* (2013.01); *G06F 8/34* (2013.01)

(58) Field of Classification Search
None
See application file for complete search history.

(56) References Cited

U.S. PATENT DOCUMENTS

| 6,879,933 | B2* | 4/2005 | Steffey et al. ................. 702/155 |
| 6,957,122 | B2* | 10/2005 | Dutsch et al. ................. 700/180 |
| 7,331,039 | B1* | 2/2008 | Yip et al. ....................... 717/125 |
| 7,987,427 | B1* | 7/2011 | Gough et al. .................. 715/762 |
| 8,271,944 | B2* | 9/2012 | Austin et al. .................. 717/113 |
| 2003/0005180 | A1* | 1/2003 | Schmit et al. ................. 709/328 |
| 2003/0018446 | A1* | 1/2003 | Makowski et al. ........... 702/123 |
| 2004/0034847 | A1* | 2/2004 | Joffrain et al. ................ 717/113 |
| 2004/0210868 | A1* | 10/2004 | Dutsch et al. ................. 717/113 |
| 2004/0215364 | A1* | 10/2004 | Dutsch et al. ................. 700/180 |
| 2006/0005125 | A1* | 1/2006 | Reponen ....................... 715/517 |
| 2007/0124700 | A1* | 5/2007 | Koivisto et al. ............... 715/837 |
| 2009/0164923 | A1* | 6/2009 | Ovi ............................... 715/764 |

OTHER PUBLICATIONS

Luis, J. F. "Mirone: A multi-purpose tool for exploring grid data." Computers & Geosciences 33.1 (2007): 31-41.Retrieved on [Jun. 23, 2015] Retrieved from the Internet: URL<http://w3.ualg.pt/~jluis/artigos/mirone.pdf>.*

(Continued)

*Primary Examiner* — Thuy Dao
*Assistant Examiner* — Cheneca Smith
(74) *Attorney, Agent, or Firm* — Novak Druce Connolly Bove + Quigg LLP

(57) ABSTRACT

A computing device is connected to a measurement machine. The measurement machine measures an object to obtain images of measured elements of the object by using a measurement program. The computing device divides the measurement program into two or more program segments. An icon for each program segment is generated according to a type of the program segment. The computing device generates a title state and an opened state for each program segment. If a program segment is in the title state, the icon, a name, and a first line of program codes of the program segment is displayed on an interface provided by the electronic device. If the program segment is in the opened state, the computing device displays all program codes of the program segment on the interface.

16 Claims, 5 Drawing Sheets

(56) References Cited

OTHER PUBLICATIONS

Keim, Daniel. "Information visualization and visual data mining." Visualization and Computer Graphics, IEEE Transactions on 8.1 (2002): 1-8. Retrieved on [Jun. 23, 2015] Retrieved from the Internet: URL<http://ieeexplore.ieee.org/stamp/stamp.jsp?tp=&arnumber=981847>.*

* cited by examiner

LIN3      =FEAT,LINE [ ... ]
 PLN1      =FEAT,PLANE [ ... ]
 CIR1      =FEAT,CIRCLE
          THEO,2.7122,0.5776,0.9894,0,0,1,1.0666
          ACTL,2.7122,0.5776,0.9894,0,0,1,1.0666
          HIT,2.8548,0.9429,0.9894,0.3636798,0.931524,0,2.8548,0.9429,0.9894
          HIT,2.2268,0.198,0.9894,-0.7876879,-0.6160745,0,2.2268,0.198,0.9894
          HIT,2.9423,0.3094,0.9894,0.6510923,-0.7589985,0,2.9423,0.3094,0.9894
          HIT,3.4692,0.7265,0.9894,0.9811961,0.1930133,0,3.4692,0.7265,0.9894
          ENDMEAS

SYSTEM AND METHOD FOR DISPLAYING MEASUREMENT PROGRAMS

BACKGROUND

1. Technical Field

Embodiments of the present disclosure relate to program management systems and methods, and particularly to a system and a method for displaying measurement program.

2. Description of Related Art

A measurement machine measures an object to obtain images of measured elements of the object by using a measurement program. The measurement program includes a plurality of program segments. If a user wants to check or edit program codes of a program segment, the user has to search the program codes of the program segment from amongst the total program codes of the measurement program. The program codes of the measurement program are always very complicated. It is time-consuming for the user to check or edit the program codes. If the user edits a program code with a minor error, all the program codes of the measurement program may be affected.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media may include CDs, DVDs, BLU-RAY, flash memory, and hard disk drives.

Figure 1:
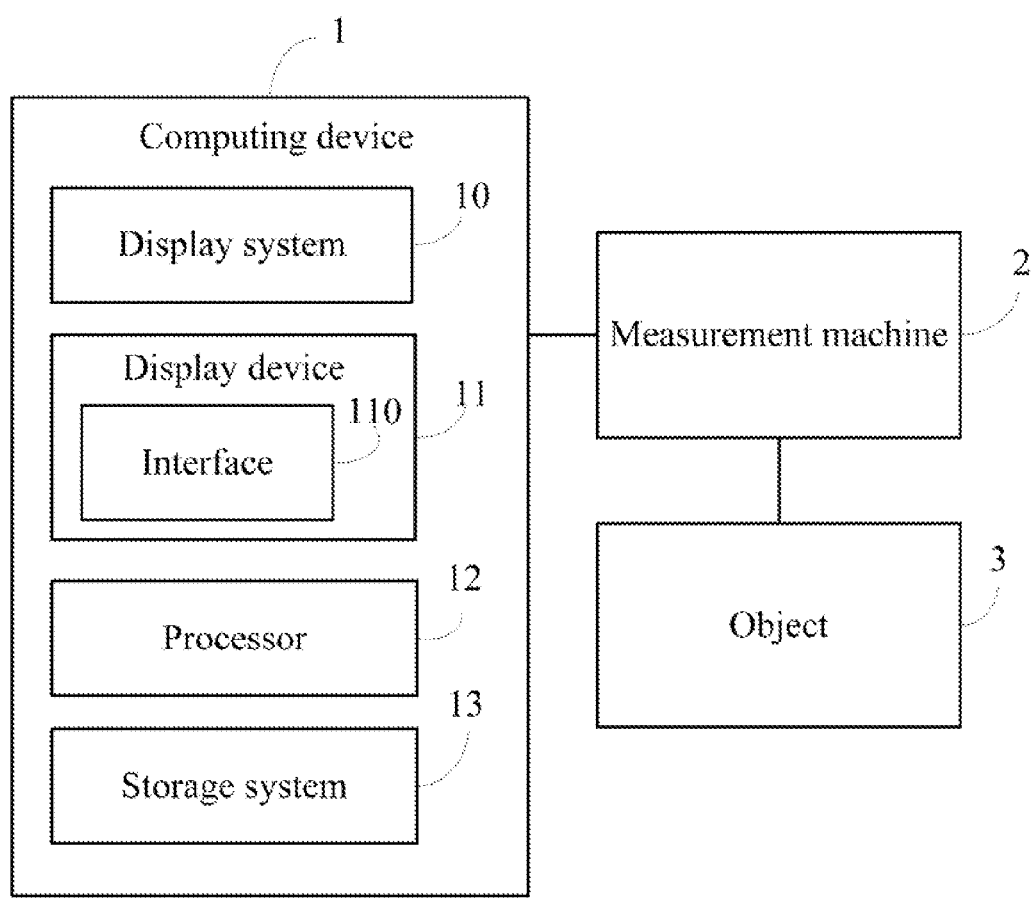
FIG. 1 is a block diagram of one embodiment of a computing device comprising a display system.

FIG. 1 is a block diagram of one embodiment of a computing device 1 including a display system 10 and a display device 11. The computing device 1 may be a computer, a server, or a personal digital assistant (PDA), for example. In one embodiment, the computing device 1 may be electronically connected to a measurement machine 2. The measurement machine 2 measures an object 3 to obtain images of measured elements of the object 3. The measured elements may be lines, points, and circles, for example.

In an exemplary embodiment, the computing device 1 includes at least one processor 12 and a storage system 13. The display system 10 may include one or more modules (also described in FIG. 2). The one or more modules may comprise computerized code in the form of one or more programs that are stored in the storage system 13. In one embodiment, the storage system 13 may be a magnetic storage system, an optical storage system, or other suitable storage medium. The computerized code includes instructions that are executed by the at least one processor 12 to provide functions for the one or more modules described below.

The storage system 13 stores measurement programs for the object 3. In one embodiment, the measurement programs may be coordinate measurement programs. The measurement machine 2 obtains coordinate values of points of the object 3 using a coordinate measurement program. The display device 11 provides an interface 110 to display the measurement programs of the object 3. The measurement programs may include information (e.g., names) of each measured element, such as "PNT1" which indicates a point on the object 3, "LIN 2" which indicates a line on the object 3.

Figure 2:
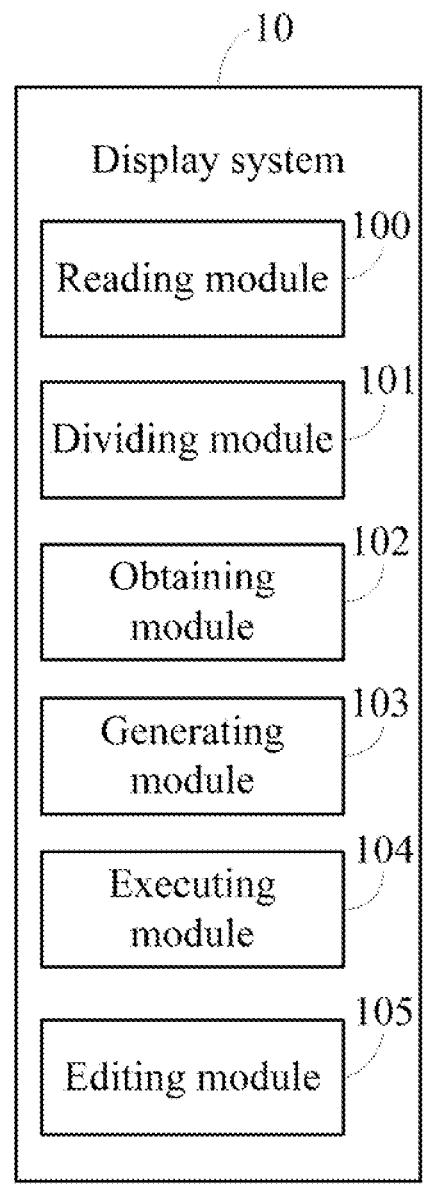
FIG. 2 is a block diagram of one embodiment of the function modules of the display system in FIG. 1.

As shown in FIG. 2, the display system 10 includes a reading module 100, a dividing module 101, an obtaining module 102, a generating module 103, an executing module 104, and an editing module 105.

The reading module 100 reads a measurement program from the storage system 13.

The dividing module 101 divides the measurement program into two or more program segments according to a predefined type set by a user. The predefined type may be an object type or a parameter type, for example. The object type may include points, lines, and circles. The parameter type may include a moving speed and a velocity of impact points, for example.

The obtaining module 102 obtains information of each program segment, and stores the information of each program segment in an array. In one embodiment, the array is a two-dimensional array. The information of each program segment includes program codes, a type and a name of the program segment.

Figure 5:
FIG. 5 shows one embodiment of an interface displaying measurement programs.
Figure 5:
Figure 5:

The generating module 103 generates an icon for each program segment on the interface 110 according to the type of the program segment. For example, if the measurement program is divided according to the object type, a type of a program segment of the measurement program is a circle and the name of the circle is "CIR1," the generating module 103 generates an icon showing a circle for the program segment, as shown in FIG. 5.

The executing module 104 generates a title state and an opened state for each program segment and obtains program codes of each program segment. The executing module 104 obtains an address of a program segment in the two-dimensional array, and obtains a start mark and an end mark of program codes corresponding to the program segment. The executing module 104 obtains the program codes of the program segment from the two-dimensional array according to the start mark and the end mark of the program codes.

If the program segment is in the opened state, the executing module 104 displays the program codes of the program segment after the icon and the name of the program segment. If the program segment is in the title state, the program segment only displays the icon and the name of the program segment. In another embodiment, if the program segment is in the title state, the executing module 104 displays the icon, the name and the first line of the program codes on the interface 110, and displays a control box after the first line of the program codes. The control box may be drawn as a picture of suspension points, as shown in FIG. 5. If a cursor is moved on the control box, all the program codes will be shown on the interface 110 The user can select the title state or the opened state of each program segment on the interface 110. As shown in FIG. 5, a symbol "+" indicates that the program segment is in the title state. A symbol "−" indicates that the program segment is in the opened state.

The editing module 105 receives user-edits of program codes of a selected program segment, and displays the edited program codes on the interface 110. The edits includes adding, deleting, and modifying the program codes, for example. For example, as shown in FIG. 5, if the user wants to delete a program segment named "PN1" (hereinafter "program segment PN1") after the program segment named "LIN3", the editing module 105 searches for an address of the program segment PN1 in the two-dimensional array and deletes information of the program segment PN1. The editing module 105 updates addresses of the remaining program segments after the program segment PN1 has been deleted. The interface 110 displays the program segments named "CIR1" after the program segment named "LIN3."

Figure 3:
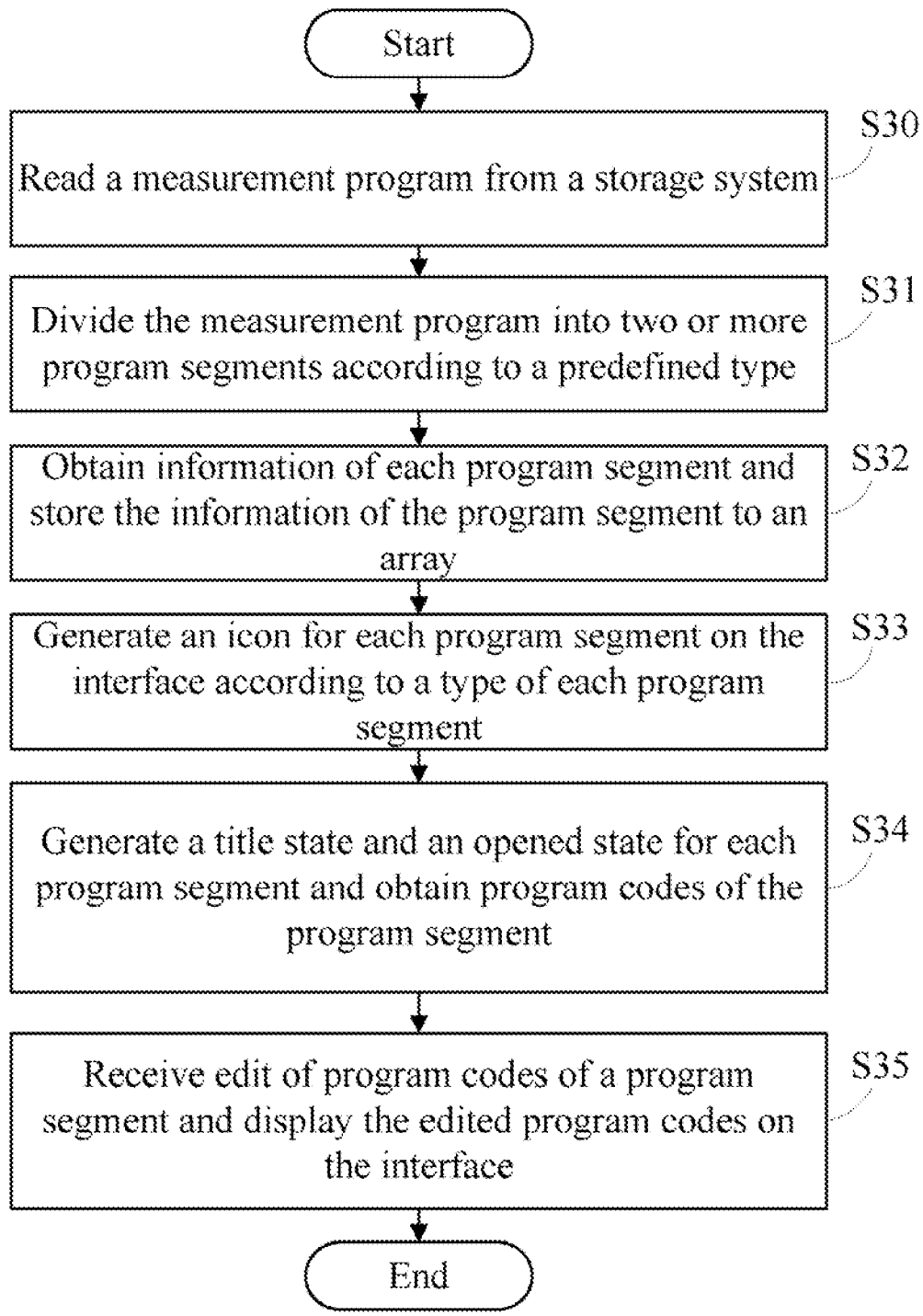
FIG. 3 is a flowchart illustrating one embodiment of a method for displaying measurement programs.

FIG. 3 is a flowchart illustrating a method for displaying measurement programs. Depending on the embodiment, additional steps may be added, others removed, and the ordering of the steps may be changed.

In step S30, the reading module 100 reads a measurement program from the storage system 13.

In step S31, the dividing module 101 divides the measurement program into two or more program segments according to a predefined type set by a user. In one embodiment, the predefined type may be an object type. The object type may include points, lines, and circles.

In step S32, the obtaining module 102 obtains information of each program segment, and stores the information of each program segment in an array. The information of each program segment includes program codes, a type and a name of the program segment.

In step S33, the generating module 103 generates an icon for each program segment on the interface 110 according to a type of the program segment.

In step S34, the executing module 104 generates a title state and an opened state for each program segment and obtains program codes of each program segment.

In step S35, the editing module 105 receives edits of program codes of a selected program segment by a user, and displays the edited program codes on the interface 110.

Figure 4:
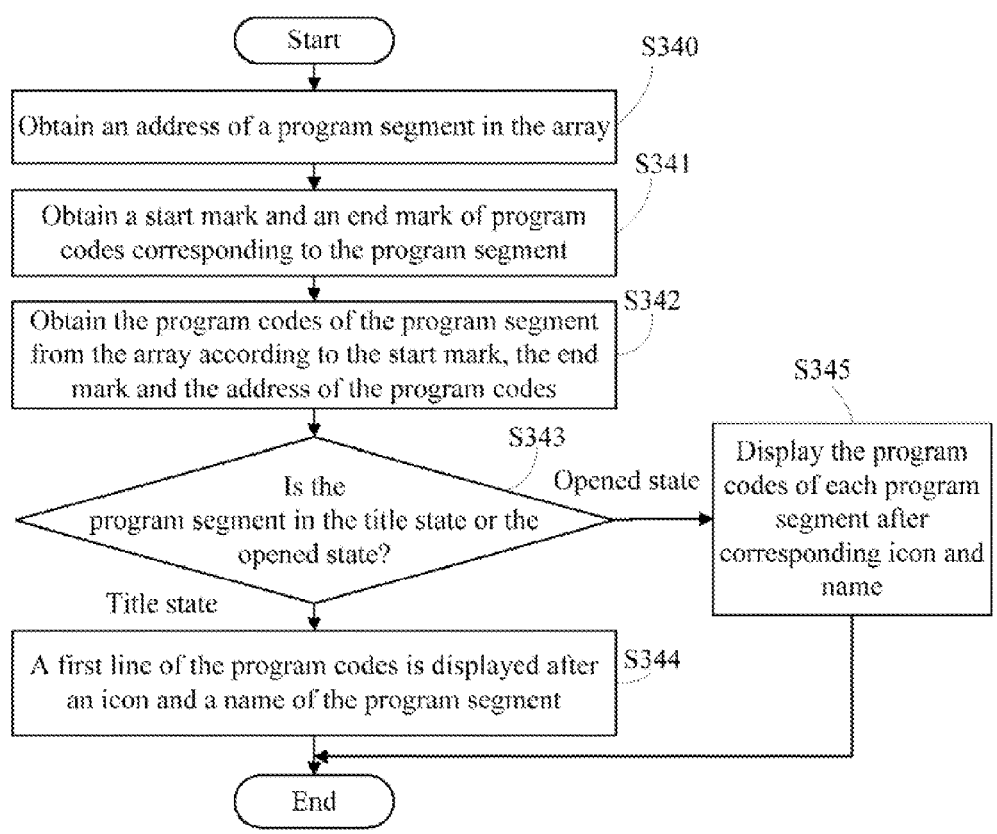
FIG. 4 is a detailed flowchart illustrating one embodiment of step S34 in FIG. 3.

FIG. 4 is a detailed flowchart illustrating one embodiment of step S34 in FIG. 3. Depending on the embodiment, additional steps may be added, others removed, and the ordering of the steps may be changed.

In step S340, the executing module 104 obtains an address of a program segment in the array.

In step S341, the executing module 104 obtains a start mark and an end mark of program codes corresponding to the program segment.

In step S342, the executing module 104 obtains the program codes of the program segment from the array according to the start mark, the end mark and the address of the program codes.

In step S343, the executing module 104 detects if the user selects the title state or the opened state. If the title state is selected, step S344 is implemented. If the opened state is selected, step S345 is selected.

In step S344, a first line of the program codes is displayed after the icon and the name of the program segment. In one embodiment, control box is shown with the first line of the program codes. If a cursor is moved on the control box, all the program codes will be shown. The control box may be drawn as suspension points, as shown in FIG. 5.

In step S345, the executing module 104 displays the program codes of each program segment after corresponding icon and name.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a processor of a computing device for displaying measurement programs, comprising:
    dividing the measurement program into two or more program segments according to a predefined type, the predefined type comprising an object type or a parameter type, the object type comprising points, lines, and circles, and the parameter type comprising a moving speed and a velocity of impact points;
    obtaining information of each program segment from a storage system of an electronic device, wherein the information comprises program codes, a type and a name of each program segment;
    generating an icon for each program segment on an interface displayed on a display device according to the type of each program segment; and
    generating a title state and an opened state for each program segment, obtaining an address, a start mark, and an end mark of program codes of the program segment, obtaining program codes of the program segment according to the address, the start mark, and the end mark, and displaying the obtained program codes when the program segment is in the opened state.

2. The method as described in claim 1, after the obtaining step further comprising:
    storing the information of the program segment in an array.

3. The method as described in claim 2, further comprising:
    receiving edits of program codes stored in the array, and displaying the edited program codes on the interface.

4. The method as described in claim 1, further comprising:
    displaying the icon, the name and a first line of the program codes of the program segment on the interface when the program segment is in the title state.

5. The method as described in claim 4, further comprising:
    displaying a control box with the first line of the program codes; and
    displaying all the program codes of the program segment when a cursor is moved on the control box.

6. A computing device, comprising:
    a storage system;
    at least one processor; and
    one or more programs being stored in the storage system and executable by the at least one processor, the one or more programs comprising:
    a dividing module that divides a measurement program into two or more program segments according to a predefined type, the predefined type comprising an object type or a parameter type, the object type comprising points, lines, and circles, and the parameter type comprising a moving speed and a velocity of impact points;
    an obtaining module that obtains information of each program segment from the storage system, wherein the information comprises program codes, a type and a name of each program segment;
    a generating module that generates an icon for each program segment on an interface displayed on a display device according to the type of each program segment; and an executing module that generates a title state and an opened state for each program segment, obtains an address, a start mark, and an end mark of program codes of the program segment, obtains program codes of the program segment according to the address, the start mark, and the end mark, and displays the obtained program codes when the program segment is in the opened state.

7. The computing device as described in claim 6, wherein the obtaining module further stores the information of the program segment in an array.

8. The computing device as described in claim 7, wherein the one or more programs further comprises an editing module that receives edits of program codes stored in the array, and displays the edited program codes on the interface.

9. The computing device as described in claim 6, wherein the executing module further displays the icon, the name and a first line of the program codes of the program segment on the interface when the program segment is in the title state.

10. The computing device as described in claim 9, wherein the executing module further displays a control box with the first line of the program codes.

11. The computing device as described in claim 10, wherein the executing module further displays all the program codes of the program segment when a cursor is moved on the control box.

12. A non-transitory storage medium having stored thereon instructions that, when executed by a processor, cause the processor to perform a method for displaying measurement program, the method comprising:
dividing the measurement program into two or more program segments according to a predefined type, the predefined type comprising an object type or a parameter type, the object type comprising points, lines, and circles, and the parameter type comprising a moving speed and a velocity of impact points;
obtaining information of each program segment from a storage system of an electronic device, wherein the information comprises program codes, a type and a name of each program segment;
generating an icon for each program segment on an interface displayed on a display device according to the type of each program segment; and
generating a title state and an opened state for each program segment, obtaining an address, a start mark, and an end mark of program codes of the program segment, obtaining program codes of the program segment according to the address, the start mark, and the end mark, and displaying the obtained program codes when the program segment is in the opened state.

13. The non-transitory storage medium as described in claim 12, after the obtaining step further comprising: storing the information of the program segment in an array.

14. The non-transitory storage medium as described in claim 13, further comprising: receiving edits of program codes stored in the array, and displaying the edited program codes on the interface.

15. The non-transitory storage medium as described in claim 13, further comprising:
displaying a control box with the first line of the program codes; and
displaying all the program codes of the program segment when a cursor is moved on the control box.

16. The non-transitory storage medium as described in claim 12, further comprising:
displaying the icon, the name and a first line of the program codes of the program segment on the interface when the program segment is in the title state.

* * * * *